(12) United States Patent
Meyer (10) Patent No.: US 6,266,058 B1
(45) Date of Patent: Jul. 24, 2001

(54) APPARATUS AND METHOD FOR LINKING BROWSER BARS WITH ACTIVE DOCUMENTS FOR A BROWSER

(75) Inventor: Shane Douglas Meyer, Windsor, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/149,775

(22) Filed: Sep. 8, 1998

(51) Int. Cl.[7] ............................................ G06F 3/00
(52) U.S. Cl. .................... 345/339; 345/340; 345/329; 345/346; 707/513; 707/515
(58) Field of Search ................................. 345/329, 330, 345/331, 332, 346, 357, 348, 349, 350, 351, 352; 707/513, 515, 901

(56) References Cited

U.S. PATENT DOCUMENTS

| | | | |
|---|---|---|---|
| 5,630,042 | * 5/1997 | McIntosh et al. | 345/340 |
| 5,883,626 | * 3/1999 | Glaser et al. | 345/342 |
| 5,890,172 | * 3/1999 | Borman et al. | 707/501 |
| 5,914,714 | * 6/1999 | Brown | 345/339 |
| 5,937,417 | * 10/1999 | Nielsen | 707/513 |
| 6,072,486 | * 6/2000 | Sheldon et al. | 345/339 |

* cited by examiner

Primary Examiner—Raymond J. Bayerl
Assistant Examiner—Cuong T. Thai

(57) ABSTRACT

An apparatus and method provides for active documents to be linked with the standard browser bar. This linkage allows for software components contained by the browser to work together and feel like an integrated application to the end user. The integrated applications allow for an user to input data in the browser bar and see the related contents in the active document window. The user can also work inside of an active document containing a program and have the linking be reflected in the browser bar.

15 Claims, 9 Drawing Sheets

APPARATUS AND METHOD FOR LINKING BROWSER BARS WITH ACTIVE DOCUMENTS FOR A BROWSER

BACKGROUND OF THE INVENTION

1. Field of the Invention

The present invention generally relates to computers and software, and more particularly, to linking browser bars and active documents within a browser.

2. Description of Related Art

As known in the art, the Internet is a world-wide collection of networks and gateways that use the TCP/IP suite of protocols to communicate with one another. At the heart of the Internet is a backbone of high speed data communication lines between major nodes or host computers consisting of thousands of commercial government educational and other computer systems that route data and messages.

The World Wide Web (WWW) refers to the total set of interlinked hypertext documents residing on hypertext transfer protocol (HTTP) servers all around the world. Documents on the WWW, called pages or web pages, are written in hypertext mark-up language (HTML) identified by uniform resource locators (URL) that specify the particular machine and pathname by which a file can be accessed and transmitted from node to node to the end user under HTTP. A web site is a related group of these documents and associated files, scripts, subprocedures, and databases that are served up by an HTTP server on the WWW.

Users need a browser program and an Internet connection to access a web site. Browser programs, also called "web browsers," are client applications that enable a user to navigate the Internet and view HTML documents on the WWW, another network, or the user's computer. Web Browsers also allow users to follow codes called "tags" imbedded in an HTML document, which associate particular words and images in the document with URLs so that a user can access another file that may be half way around the world, at the press of a key or the click of a mouse.

Browser bars are an Internet Explorer technology called Explorer Bars. Currently, the browser bar is visible on the left side of the Internet Explorer window. The standard browser bars that ship with Internet Explorer are search, channels, history, and favorites. Currently, for Internet Explorer Microsoft provides an application program interface (API) to allow third parties to write their own browser bar programs. An API is a set of routines used by an application program to direct a performance of the procedures by the computer's operating system.

Active documents are technology that allow a document, for example, a Word document, to be contained by any application that supports active documents. Internet Explorer is one of the few applications that behaves as an active document container. This allows any active document to be contained by Internet Explorer. You load a Word document into Internet Explorer and display it inside its window because Word documents are active documents.

ActiveX is a set of technology that enables software components to interact with one another in a networked environment regardless of the language in which the components are created. Currently, ActiveX is used primarily to develop interactive content for the World Wide Web, although it can be used in other desktop applications. ActiveX controls are reusable software components that incorporate ActiveX technology. These components can be used to add specialized functionality, such as animation or pop-up menus, to web pages, desktop applications, and software development tools. ActiveX control components can be used in place of active documents.

Heretofore, however, active documents or ActiveX, and browser bar technologies have not been linked together to allow an active document to actually act as a container that encapsulates other Windows programs. This would allow Internet Explorer to contain active documents and active documents to contain other Windows programs. This linking of browser bar and active Windows technologies will allow for an interaction that will look and feel like an integrated application.

SUMMARY OF THE INVENTION

Certain objects, advantages, and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an apparatus and method for providing linkage between active documents and a browser bar.

In accordance with one embodiment of the present invention, a user interface (browser) provides for active documents to be linked with the standard browser bar. This linkage enables applications to appear like integrated applications. The integrated applications enables for a user to click on an item within the browser bar and see the related contents in the active document window. The user can also work inside of an active document containing a program and have the linking be reflected in the browser bar. Changes input to the active document can update information in the browser bar, that can also cause further changes to data in the active document.

In accordance with another embodiment of the present invention, a user can bring up an active document within Internet Explorer in any way such as typing its path to an Internet Explorer address field, pulling down the document from an Internet Explorer favorite menu, dragging an active document into the Internet Explorer main window, using the document as an Internet Explorer start page and then just access it by starting Internet Explorer.

In accordance with another embodiment of the present invention, the browser bar and active document linkage insures that every time an active document is displayed, the browser bar is also displayed.

In accordance with yet another embodiment of the present invention, the active documents containing programs are permitted to direct the browser bar to appear and disappear.

In accordance with another embodiment of the present invention, the browser bar can be directed to make a document appear or disappear.

BRIEF DESCRIPTION OF THE DRAWINGS

The accompanying drawings incorporated in and forming a part of the specification illustrate several aspects of the present invention, and together with the description, serve to explain the principles of the invention. In the drawings.

DETAILED DESCRIPTION OF THE PREFERRED EMBODIMENT

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 1:
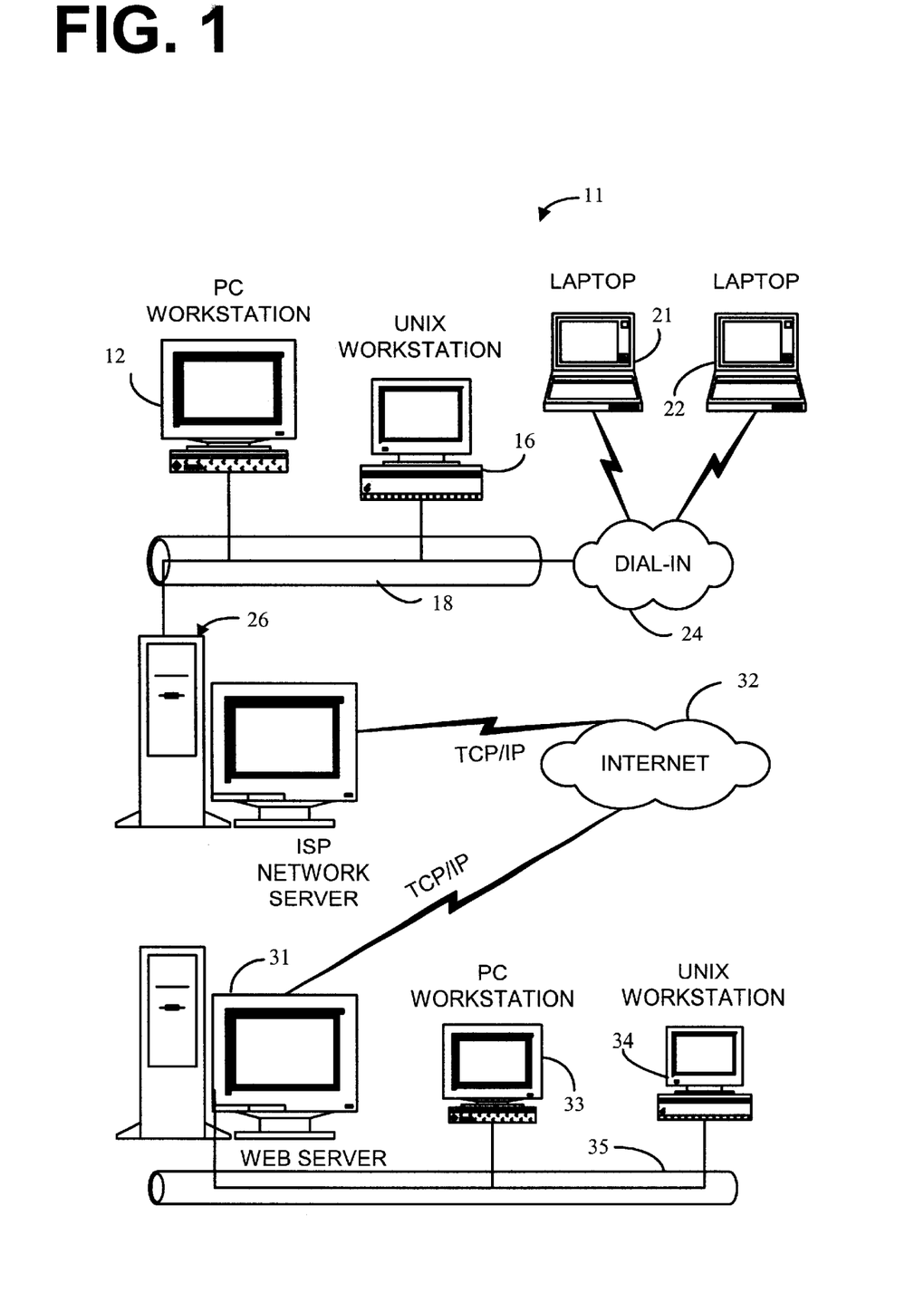
FIG. 1 is a block diagram of the client/server system utilizing the Internet.

Turning now to the drawings, FIG. 1 is a block diagram of just one system configuration that illustrates the flexibility, expandability, and platform independence of the present invention. While the system configuration could take many forms, the diagram of FIG. 1 illustrates a plurality of diverse workstations 12, 14 and 16 directly connected to a network, for example, but not limited to, a LAN 18. Additional workstations 21, 22 may similarly be remotely located and in communication with the network 18 through a dial-in or other connection 24. Each of the workstations in FIG. 1 are uniquely illustrated to emphasize that workstations may comprise a diverse hardware platform.

As is well known, browser applications are provided and readily available for a variety of hardware platforms. Browsers are most commonly recognized for their utility for accessing information over the Internet 32. As aforementioned, a browser is a device or platform that allows a user to view a variety of service collections. The browser retrieves information from a web server 31 or network server 26 using HTTP, then interprets HTML code, formats, and displays the interpreted result on a workstation display.

Additional workstations 33 and 34 may similarly be located and in communication with the web servers 31 for access to web pages on the local server and the Internet. Workstations 33 and 34 communicate with the web server 31 on a LAN network 35. Networks 18 and 35 may be, for example, Ethernet type networks, also known as 10 BASE 2, 10 BAS 5, 10 BSAF, 10 BAST, BASE BAN network, COAX cable, and the like.

Figure 2:
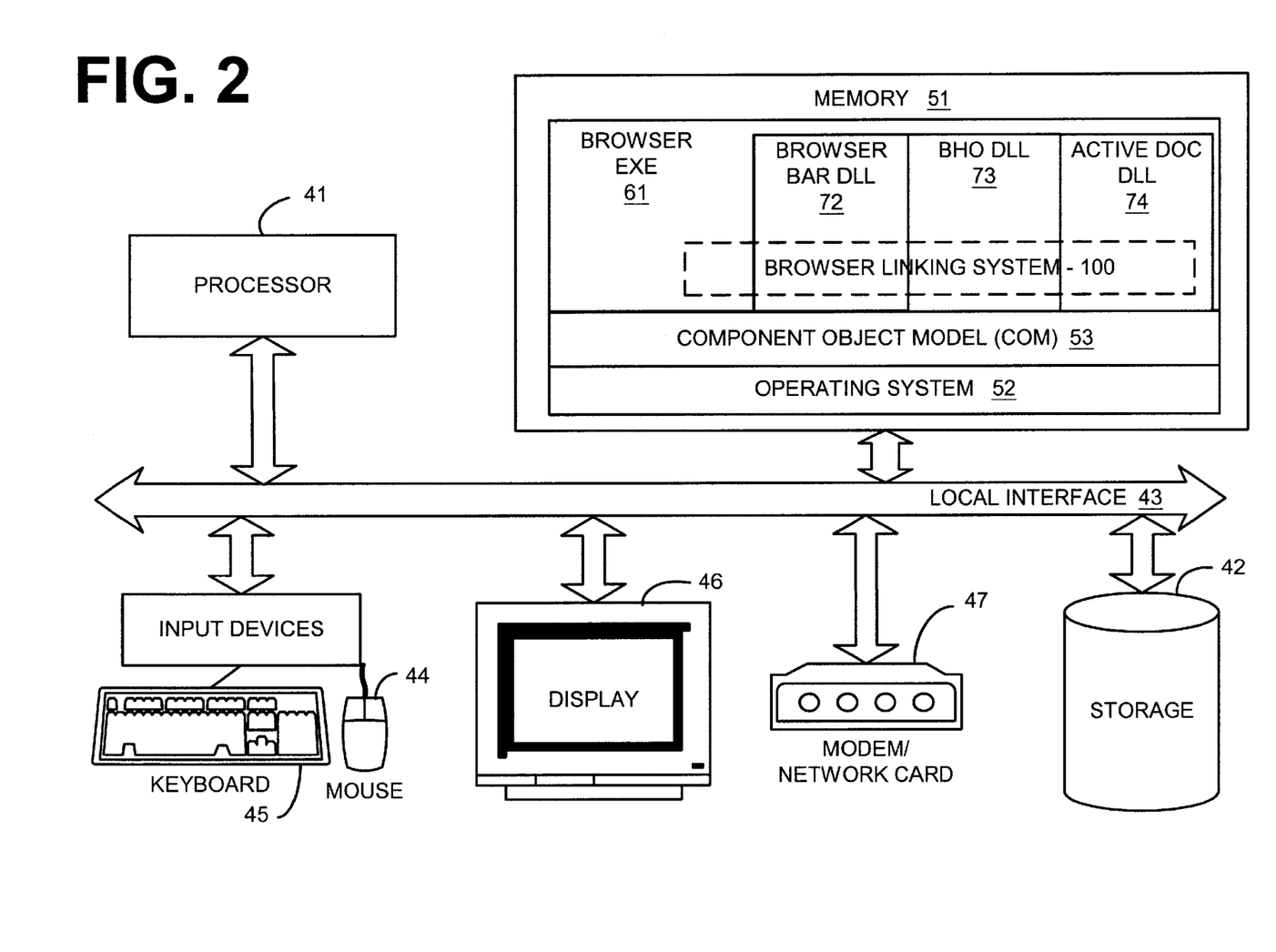
FIG. 2 is a block diagram illustrating a browser program situated within a computer readable medium, where the browser includes a browser bar dynamic link library (DLL), browser helper object DLL, an active document DLL and the browser linking system of the present invention.

As illustrated in FIG. 2 client systems today generally include only a browser program 61 (e.g., Netscape, Internet Explorer, or other browser program) for use in accessing locations on a network 11. These browser programs 61 reside in computer memory 51 and access communication facilities modem 47 to transport the user to other resources connected to the network 11. In order to find a resource, the user should know the network location of the resource denoted by a network location identifier or URL. These identifiers are often cryptic, following very complex schemes and formats in their naming conventions.

Systems today identify, access, and process these resources desired by a user by using the processor 41, storage device 42, and memory 51 with an operating system 52 and window manager 53. The processor accepts data from memory 51 and storage 42 over the bus 43. Direction from the user can be signaled by using the input devices mouse 44 and keyboard 45. The actions input and result output are displayed on the display terminal 46.

The first embodiment of the present invention involves the browser program 61. The browser programs 61 are the software that interacts with the server to obtain the requested data and functionality requested by the client user. The browser programs 61 contain a browser bar dynamic link library (DLL) 72, a browser helper object (BHO) DLL 73, and an active document DLL 74, as well as the browser linking system 100 of the present invention.

The browser bar DLL 72 is the program that controls the operation of the browser bar within the browser 61. The BHO DLL 73 controls the browser linking of the current browser bar to an active document The active document DLL 74 is the program that controls the operation of the active document. The browser linking system 100 of the present invention is the apparatus and method for providing communication and linking of the browser bar DLL 72 and the active documents DLL 74 in operation.

Figure 3:
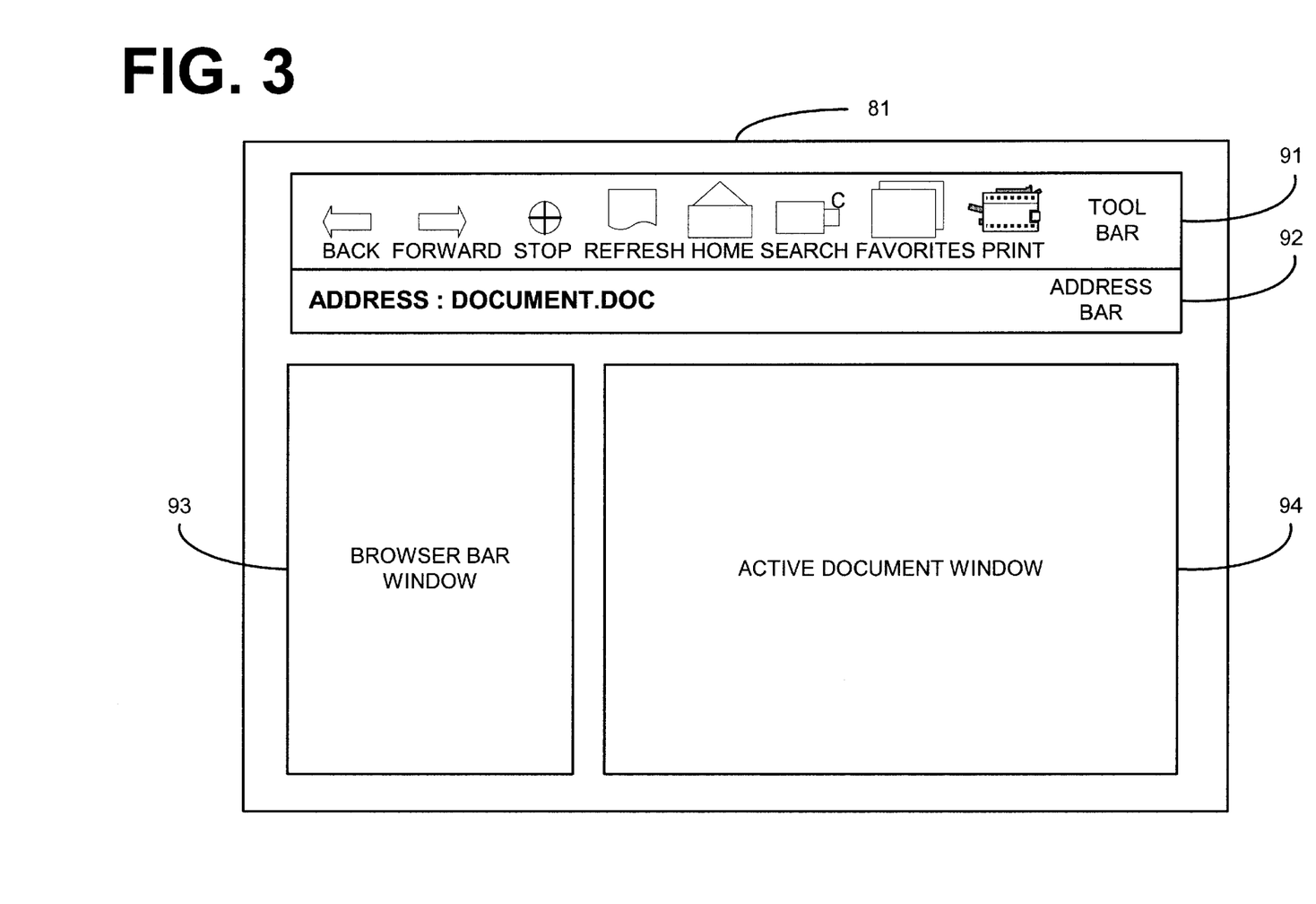
FIG. 3 is a block diagram illustrating a browser with the browser bar and active document window of the present invention.

Illustrated in FIG. 3 is a block diagram of a browser screen 81. Within the browser screen 81 is the tool bar 91 that provides for functionality to the browser to flow through data. The address bar 92 is the tool which is utilized to direct the browser to a particular location within a public network, such as the Internet.

Figure 6:
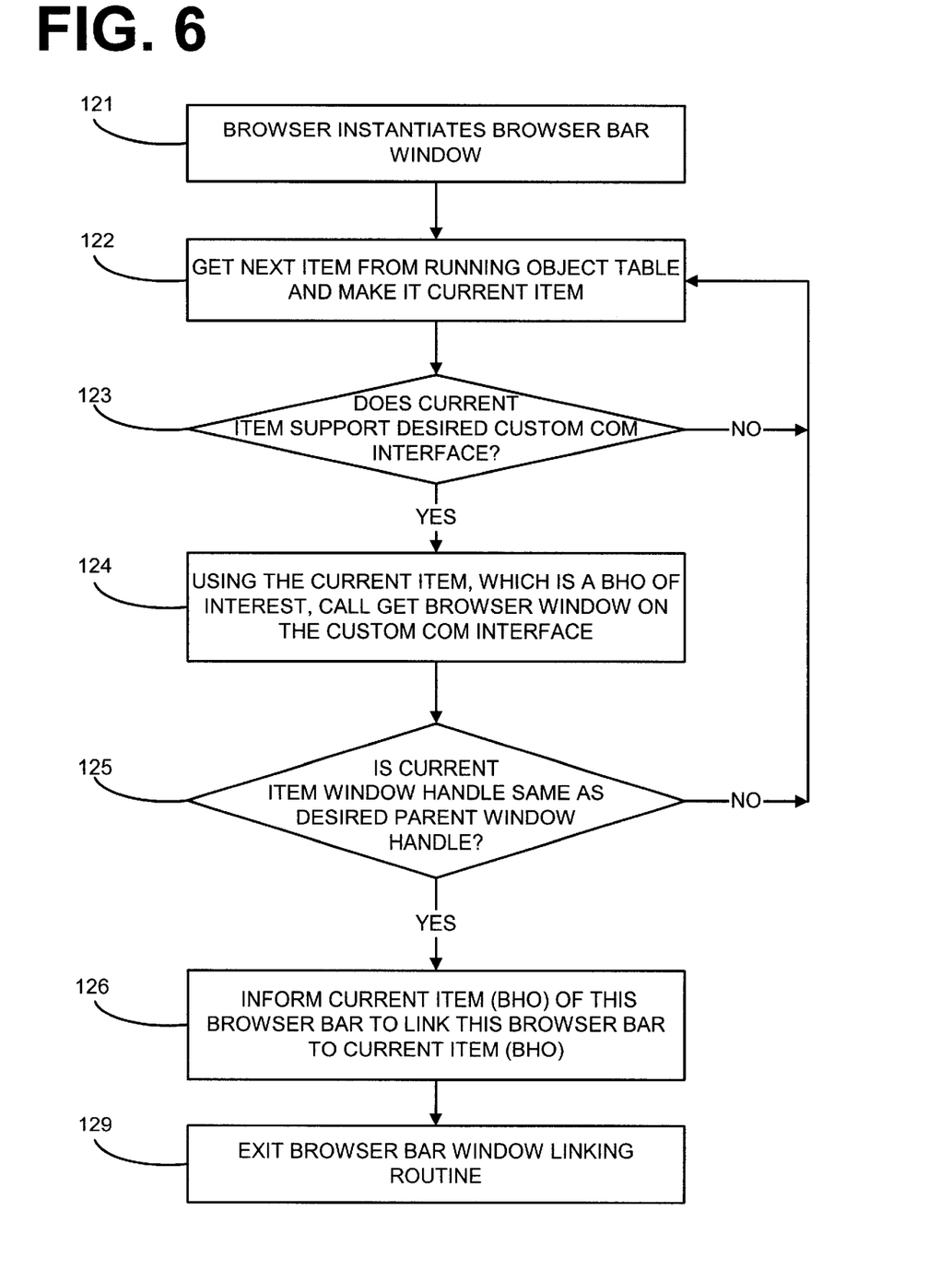
FIG. 6 is a flow chart of the process that links a browser bar to a browser helper object as shown in FIG. 4.
Figure 8:
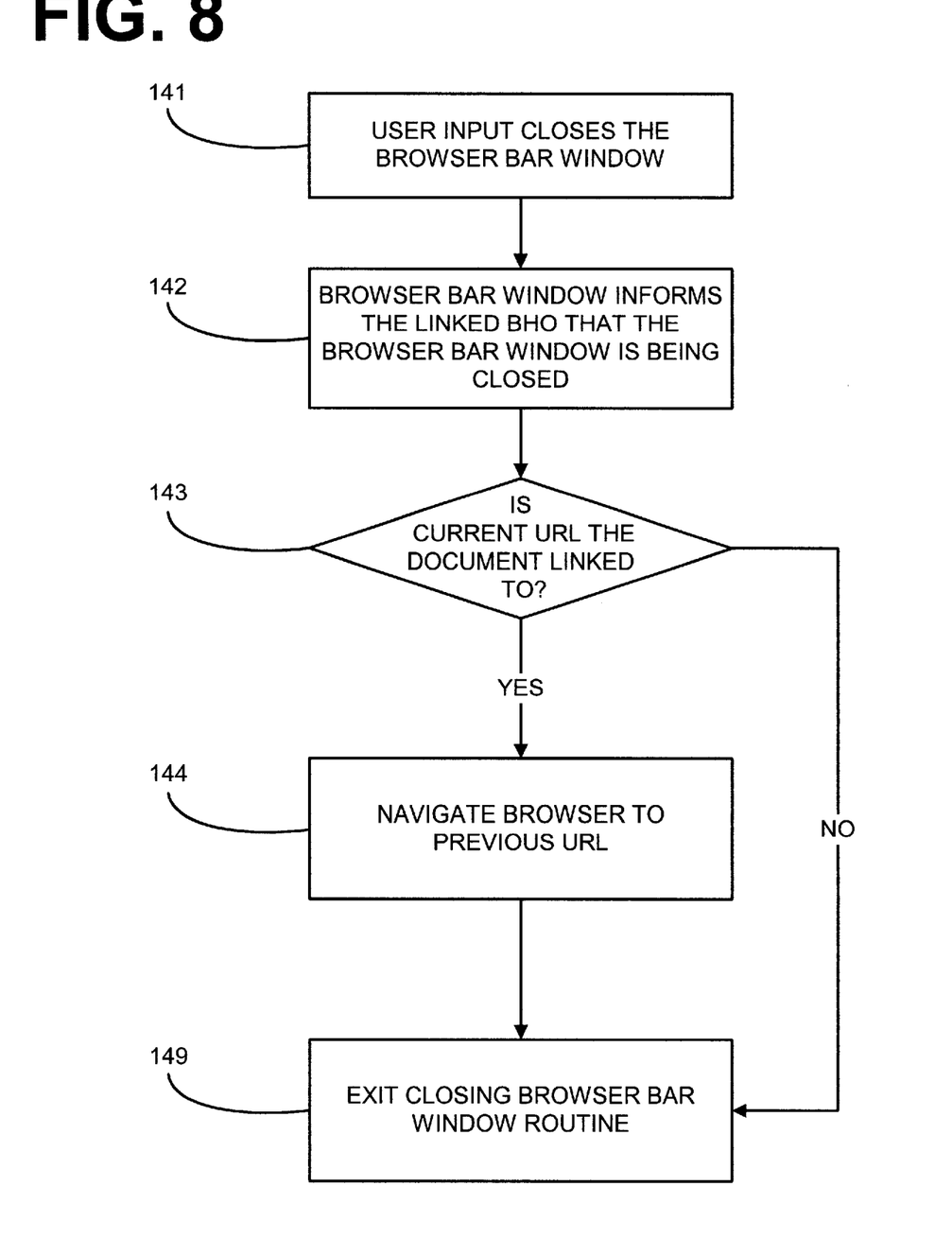
FIG. 8 is a flow chart of the process that closes an active document when the linked to browser bar is closed.
Figure 9:
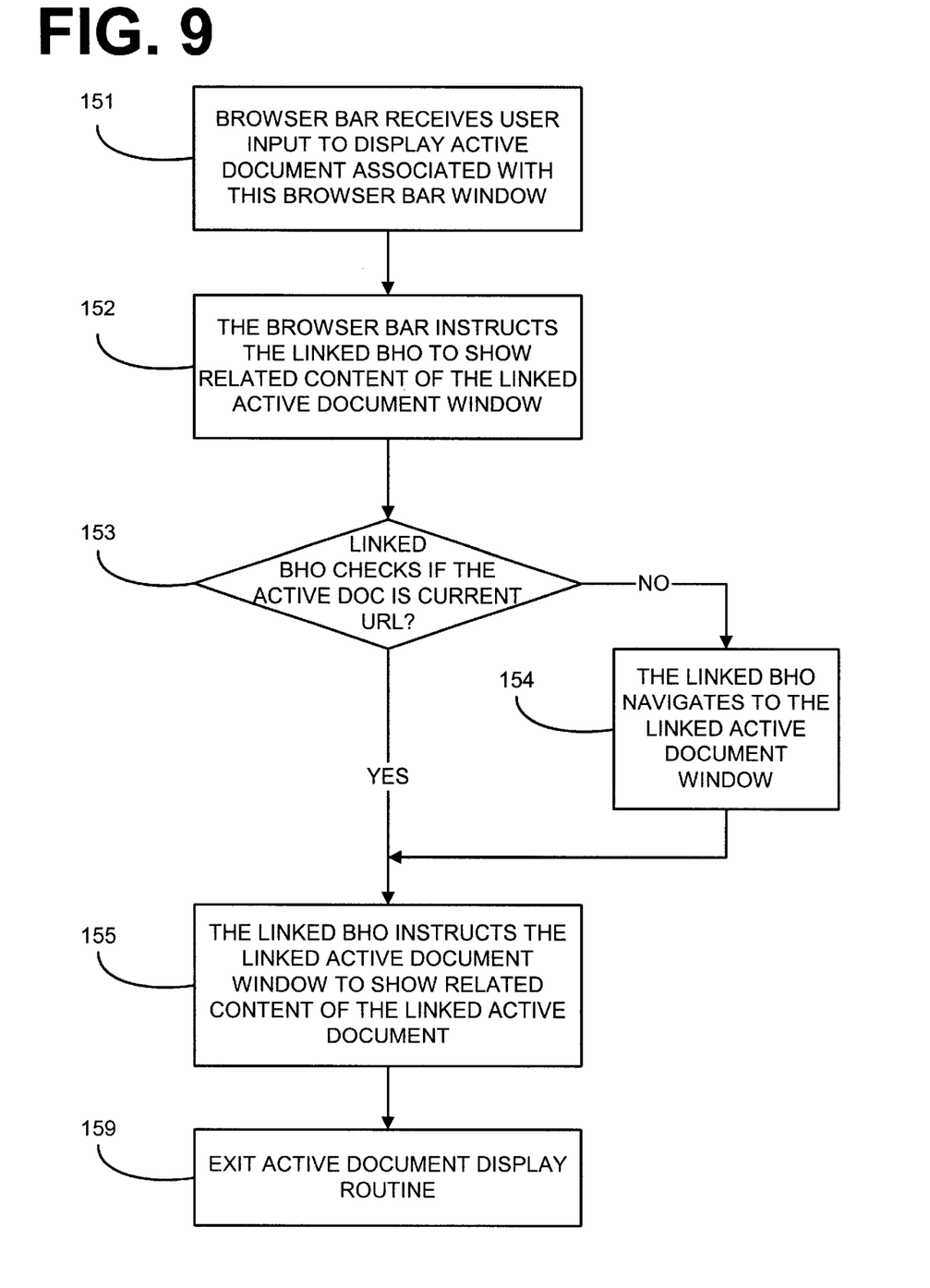
FIG. 9 is a flow chart of the process that displays an active document linked to a browser bar as shown in FIG. 4.

The browser bar window 93 is the area that provides for quick action functionality and is, herein defined in further detail with regard to FIGS. 6, 8 and 9. The browser bar window 93 could contain iconic images, for example, and when the end user clicks on one of the icons, the icon could take on a selected appearance. Then, the browser bar window 93 would inform the BHO to show the related contents in the active document. To the end user, this appears like an integrated application.

Figure 7:
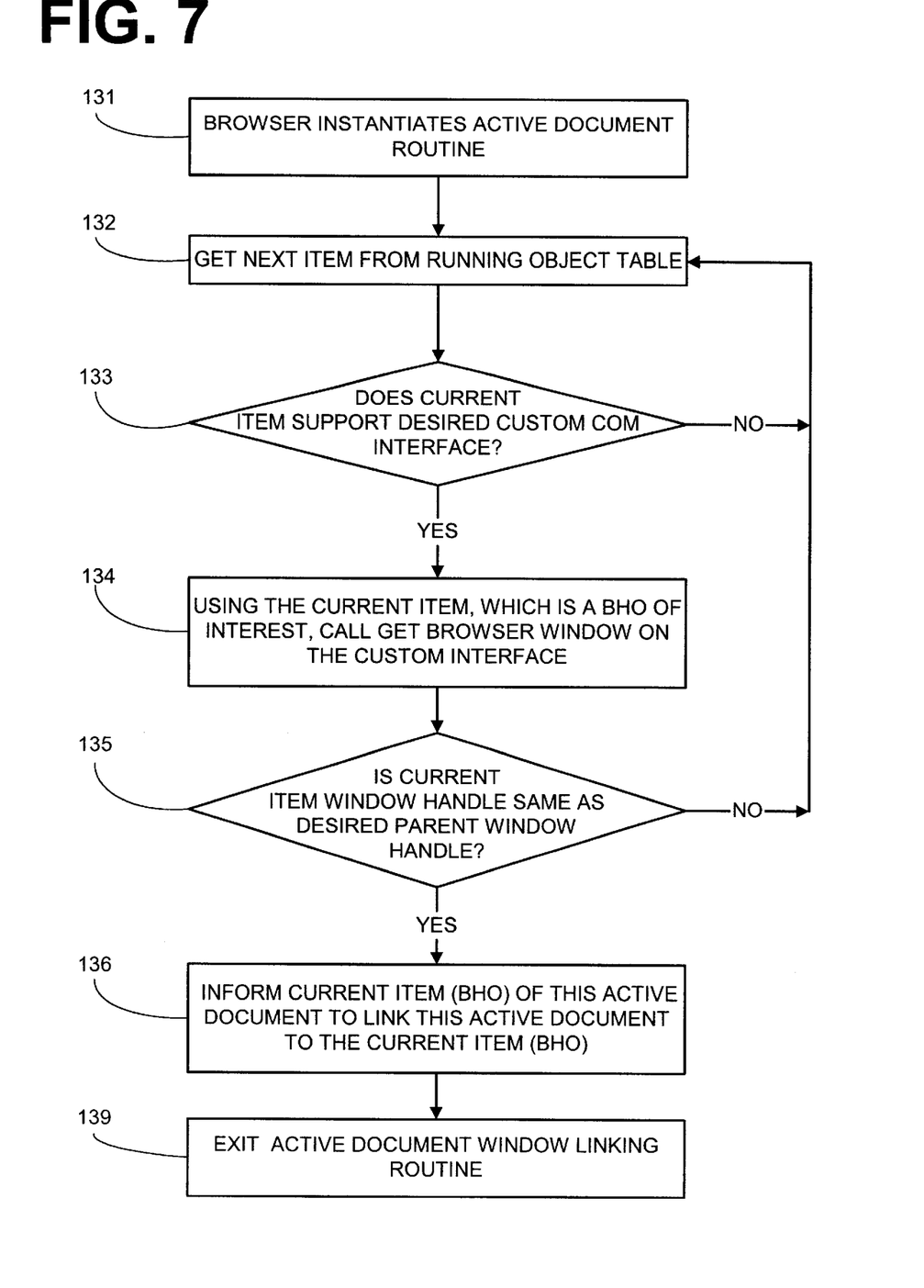
FIG. 7 is a flow chart of the process that links an active document to a browser helper object as shown in FIG. 4.

The active documents window 94 is the area that allows a document, for example, a Word document, to be displayed and is herein further defined in detail with regard to FIGS. 7, 8 and 9. The active document could contain any graphical Windows code. For example, the active document could render a graphical interface that relates to the currently-selected icon in the browser bar. It would not have to be a traditional active document like a Microsoft Word document.

Figure 4:
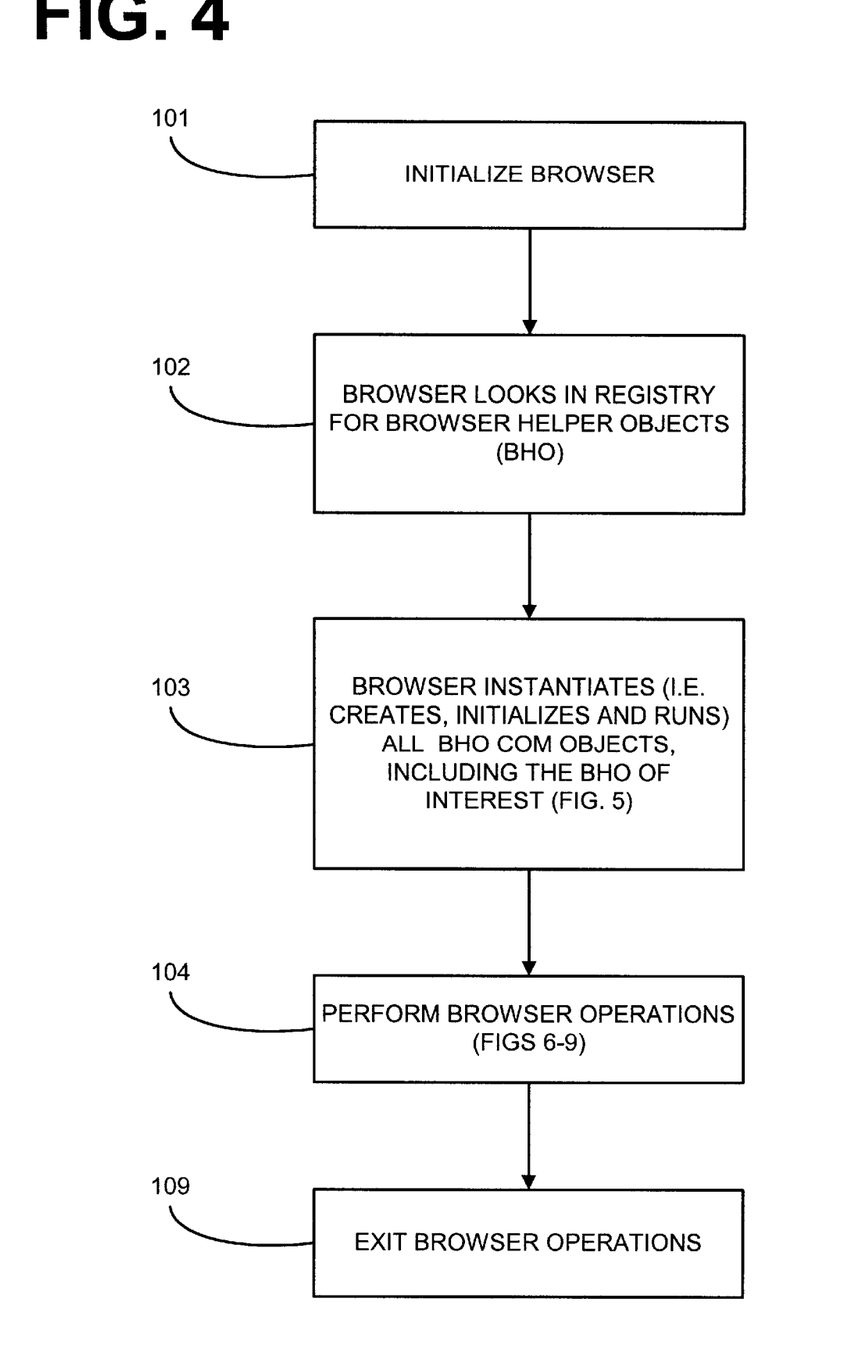
FIG. 4 is a flow chart for the browser process, including the creation of the BHO of interest, which is needed to establish linkage between a browser bar and an active document of the present invention as illustrated in FIGS. 2 and 3.

Illustrated in FIG. 4 is the operation of the browser 61. The browser 61 is first initialized at step 101. The browser 61 searches the Windows registry for browser helper objects (BHO) at step 102. A browser helper object is any Windows COM object, which can be thought of as a special kind of Windows program, that gets started by the browser when the browser starts. A BHO could be a simple as a program that runs in the background and has no visual appearance, or it could be a full-blown Windows application. In the present invention, the BHO is a non-visible program used to monitor and control the browser navigation as well as to establish the linkage between the browser bar and active document of interest.

The browser 61 instantiates all BHO component object model objects at step 103. The BHO of the present invention is also instantiated at step 103 and is herein further defined in detail with regard to FIG. 5. The browser 61 performs normal operations at step 104 and is herein defined in detail with regard to FIGS. 6–9. At the termination of the browser 61, the browser exits and terminates at step 109.

Figure 5:
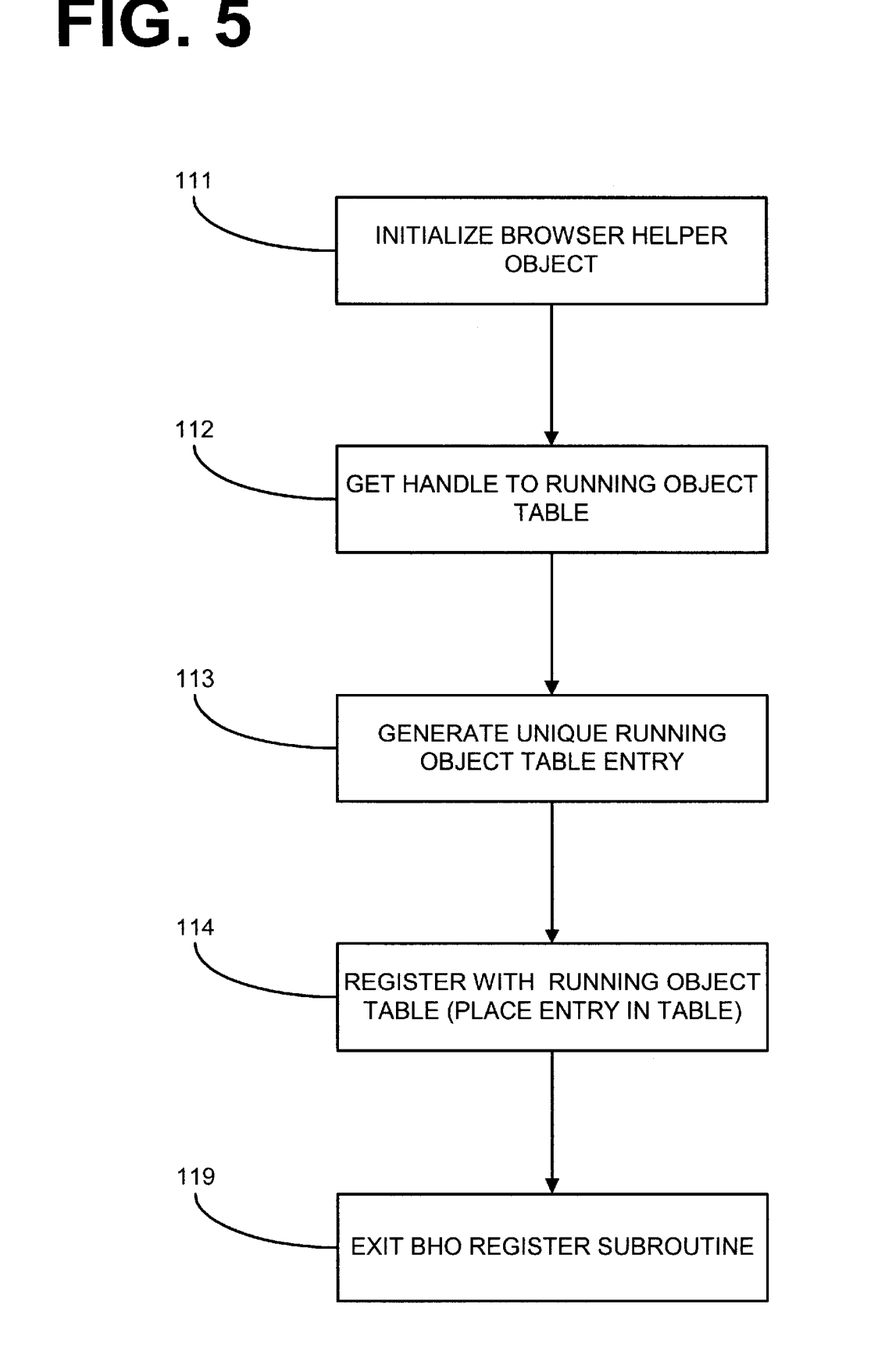
FIG. 5 is a flow chart of the browser helper object initialization process for the browser of the present invention, as shown in FIG. 4.

Illustrated in FIG. 5 is the creation of the browser helper objects (BHO) of the present invention. The BHO is the method in which the present invention provides for linkage between the browser bar and active document windows. Since there can be more than one instance of Internet Explorer running on a PC, browser bars and active documents can appear in any of them. And, since a particular browser bar must interact with an active document within the same Internet Explorer window, the correct browser bar and active document must be linked with the right BHO for a given instance of Internet Explorer. Otherwise, the following situation might occur, the end user clicks on a browser bar in an Internet Explorer window 1. This brings up an active document in a different Internet Explorer window 2, which is definitely not the expected behavior from the end user. There is one BHO for every running instance of Internet Explorer. The present invention describes how the right BHOs, browser bars, and active documents get linked based on a common parent window handle, which is Internet Explorer's window handle.

The BHO affiliated with a custom application is initialized at step 111. The browser 61 gets a handle to the running object table at step 112. The browser generates a unique running object table entry at step 113. The browser next registers with the running object table at step 114. This registration is performed by placing an entry into the running object table. The BHO registration routine is exited at step 111.

Illustrated in FIG. 6 is the operation of the browser bar window 93. The browser 61 instantiates the browser bar window 93 at step 121. The browser bar window 93 process acquires the next item from the running object table and makes it the current item at step 122. The browser bar window 93 then checks if the current item supports the desired custom component object module 53 interface at step 123. The desired custom component object model 53 interface provides an interface method on the BHO that allows for linking of a browser bar item with the BHO of the present invention. The browser bar window 93 then uses the current item, which is a BHO 73 with the desired custom component object model 53 and calls the get browser window function 93 utilizing the custom interface at step 124.

The browser bar window 93 then determines if the current item window handle is the same as the desired parent window handle at step 125. If the current item window handle is not the desired parent window handle, which means that the current BHO is not the one to link up with, the browser bar window 93 returns to step 122 to get the next item from the running object table. If the current item window handle is the same as the desired parent window handle, which means that the current BHO is the one to link up with, then the browser bar window 93 informs the current item BHO of this browser bar window 93 to link this browser bar to the current item BHO at step 126. Since the browser bar window 93 has linked the browser bar to a BHO, the browser bar window 93 linking routine then exits at step 129.

Illustrated in FIG. 7 is the operation of the active document window 94. The browser 61 instantiates the active document window 94 at step 131. The active document window 94 process gets the next item from the running object table and makes it the current item at step 132. The active document window 94 then checks if the current item supports the desired custom component object module 53 interface at step 133. The desired custom component object model 53 provides an interface method on the BHO that allows for linking of an active document item with the BHO of the present invention. The active document window 94 then uses the current item, which is a BHO supporting the custom COM interface, and calls the get browser window function 93 utilizing the custom interface at step 134. The active document window 94 then determines if the current item window handle is the same as the desired parent window handle at step 135. If the current item window handle is not the desired parent window handle, which means that the current BHO is not the one to link up with, the active document window 94 returns to step 132 to get the next item from the running object table. If the current item window handle is the same as the desired parent window handle, which means that the current BHO is the one to link up with, then the active document window 94 informs the current item BHO of this active document to link this active document to the current item BHO at step 136. Since the active document has linked the active document to a BHO, the active document window 94 linking routine then exits at step 139.

Illustrated in FIG. 8 is a process that notifies the linking BHO that a browser bar window 93 is being closed. First, the user inputs data that indicates the closing of the browser bar window 93 at step 141. The browser bar window 93 informs the BHO that linked to that browser bar window 93 that the browser bar window 93 is being closed at step 142. The BHO 93 then determines if the current URL is the active document being linked to through the BHO at step 143. If the current URL is not the active document the browser bar window 93 is linked to, then the browser bar window 93 closure routine exits at step 149. This ensures that an active document is never displayed without the linked browser bar. If the current URL is the active document linked to by the browser bar window then the BHO navigates the browser to the previous URL at step 143 and exits the closing browser bar window 93 routine at step 149.

Illustrated in FIG. 9 is the process which provides for displaying an active document that linked to a browser bar window 93. First, user input in the browser bar window 93 is received at step 151. The browser bar window 93 then instructs the linked BHO to show the related contents of the active document window 94 linked to the browser bar at step 152. The linked BHO receives the instruction at step 152 and instructs the active document window 94, linked to the BHO that is linked to the browser bar window 93, to display the contents of the linked active document at step 153. The active document display routine then exits at step 159.

The browser linking system 100, comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via, for instance, optical scanning of the paper or other medium, then compiled, interpreted or otherwise processed in a suitable manner, if necessary, and then stored in a computer memory.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for providing linkage between active documents and a browser bar, said method comprising said steps of:

creating a browser bar window;

creating a browser helper object;

linking said browser bar window to said browser helper object;

creating an active document window; and linking said active document window to said browser helper object.

2. The method of claim 1, further including the step of:

displaying a related active document in said active document window when a user selects an item within the browser bar window.

3. The method of claim 1, further including the step of:

updating a related item within said browser bar window when a user causes a change in an active document.

4. The method of claim 1, further including the step of:

closing said browser bar window when the linked active document window is closed.

5. The method of claim 1, further including the step of:

closing said active document window when the linked browser bar window is closed.

6. A computer system for providing linkage between active documents and a browser bar, comprising:

means for creating a browser bar window;

means for creating a browser helper object;

means for linking said browser bar window to said browser helper object;

means for creating an active document window; and means for linking said active document window to said browser helper object.

7. The computer system apparatus of claim 6, further comprising:

means for displaying a related active document in said active document window when a user selects an item within the browser bar window.

8. The computer system apparatus of claim 6, further comprising:

means for updating of a related item within said browser bar window when a user causes a change in an active document.

9. The computer system apparatus of claim 6, further comprising:

means for closing said browser bar window when the linked active document window is closed.

10. The computer system apparatus of claim 6, further comprising:

means for closing said active document window when the linked browser bar window is closed.

11. A computer system for providing linkage between active documents and a browser bar, comprising:

a browser bar window;

an active document window; and a browser helper object for linking said browser bar window to said browser helper object, and for linking said active document window to said browser helper object.

12. The computer system of claim 11, wherein browser helper object causes a display of a related active document in said active document window when a user selects an item within said browser bar window.

13. The computer system of claim 11, wherein browser helper object causes an update of a related item within said browser bar window when a user causes a change in an active document.

14. The computer system of claim 11, wherein browser helper object closes said browser bar window when said linked active document window is closed.

15. The computer system of claim 11, wherein browser helper object closes said active document window when the linked browser bar window is closed.

* * * * *